United States Patent [19]
Bergkamp et al.

[11] Patent Number: 5,733,094
[45] Date of Patent: Mar. 31, 1998

[54] GRAIN CART EQUIPPED WITH INDEPENDENTLY DRIVEN DRAG AUGER

[75] Inventors: Alan Bergkamp, Murdock; Richard Jacobs, Harper, both of Kans.

[73] Assignee: Dew Eze Manufacturing, Inc., Harper, Kans.

[21] Appl. No.: 526,033

[22] Filed: Sep. 8, 1995

[51] Int. Cl.⁶ ........................................................ B60P 1/00
[52] U.S. Cl. ........................... 414/526; 414/502; 414/503; 198/560.1; 198/560.6
[58] Field of Search .................................. 414/502, 503, 414/504, 505, 523, 526; 198/560.1, 560.6

[56] References Cited

U.S. PATENT DOCUMENTS

| | | | |
|---|---|---|---|
| Re. 24,920 | 1/1961 | Palmer . | |
| 2,100,937 | 11/1937 | Bowe . | |
| 2,296,014 | 9/1942 | Benzel, Sr. et al. . | |
| 2,877,914 | 3/1959 | Herr . | |
| 2,998,152 | 8/1961 | Wognum et al. | 414/505 |
| 3,021,025 | 2/1962 | Sudenga et al. . | |
| 3,171,558 | 3/1965 | Sharp | 414/526 |
| 3,283,925 | 11/1966 | Gutekunst . | |
| 3,391,778 | 7/1968 | Lasiter . | |
| 3,460,698 | 8/1969 | Harris | 414/526 |
| 3,477,599 | 11/1969 | De Coene . | |
| 3,561,681 | 2/1971 | Tyler . | |
| 3,638,812 | 2/1972 | Ryczek . | |
| 3,721,333 | 3/1973 | Boone . | |
| 3,874,530 | 4/1975 | Purdy . | |
| 3,994,512 | 11/1976 | Parker et al. . | |
| 4,071,226 | 1/1978 | Miller | 414/526 |
| 4,078,685 | 3/1978 | Corbin et al. | 414/502 |
| 4,093,087 | 6/1978 | DeCoene . | |
| 4,274,790 | 6/1981 | Barker . | |
| 4,428,182 | 1/1984 | Allen et al. . | |
| 4,529,085 | 7/1985 | Johnson . | |
| 4,662,812 | 5/1987 | Busboom et al. . | |

(List continued on next page.)

FOREIGN PATENT DOCUMENTS

| | | | |
|---|---|---|---|
| 2317898 | 10/1973 | Germany | 414/526 |
| 24 12 8163 | 9/1975 | Germany . | |
| 11130 | 1/1982 | Japan | 414/526 |
| 1167113 | 10/1969 | United Kingdom . | |

OTHER PUBLICATIONS

Sales Literature of Grain Buggy 500/675 by Kuker-Parker Industries; published prior to Sep. 8, 1994.
Sales Literature of Auger Wagons by Kinze Manufacturing, Inc.; published prior to Sep. 8, 1994.
Sales Literature of Grain Cart Model 1200 by Kill Brothers Company; published prior to Sep. 8, 1994.
Sales Literature of Hauler-Tender/Utility Boxes by United Farm Tools, Inc.; published prior to Sep. 8, 1994.
Sales Literature of Large Capacity Grain Carts by Brent Industries, Inc.; published prior to Sep. 8, 1994.
Sales Literature of Unloading Grain Cart by Royal Industries; published prior to Sep. 8, 1995.
Sales Literature of Grain Auger Wagon Model 400, Model 600S, Model 600HD, Model 800, Model 1200 by Kinze Manufacturing, Inc.; published prior to Sep. 8, 1994.

Primary Examiner—Thomas J. Brahan
Attorney, Agent, or Firm—Litman, McMahon & Brown, LLC

[57] ABSTRACT

A cart for storing and transporting granular material comprises a storage bin having sidewalls which converge inwardly and downwardly to a trough and a sump. The trough extends across a portion of the bottom of the storage bin and opens into the sump which extends at least partially below the trough. A drag auger is rotatably secured in the trough. An unloading auger assembly is secured to the storage bin and extends from the sump, upward along the front left corner of the bin and therebeyond. A lower portion of an auger of the auger assembly extends into the sump. Grain stored in the bin flows by gravity into the sump where it is advanced out of the bin by the unloading auger assembly. The drag auger may be independently engaged to advance grain to the sump which would not otherwise advance to the sump by gravity feed alone.

20 Claims, 3 Drawing Sheets

U.S. PATENT DOCUMENTS

| | | |
|---|---|---|
| 4,669,945 | 6/1987 | Pollard et al. . |
| 4,714,398 | 12/1987 | Rohwedder .............................. 414/526 |
| 4,781,513 | 11/1988 | Ajogren et al. . |
| 4,846,621 | 7/1989 | Warsaw . |
| 4,907,402 | 3/1990 | Pokash . |
| 4,923,358 | 5/1990 | Van Mill . |
| 5,013,208 | 5/1991 | Grieshop . |
| 5,100,281 | 3/1992 | Grieshop . |
| 5,108,249 | 4/1992 | Kinzenbaw et al. ..................... 414/523 |
| 5,409,344 | 4/1995 | Tharaldson . |
| 5,516,253 | 5/1996 | Linscheid et al. ....................... 414/526 |

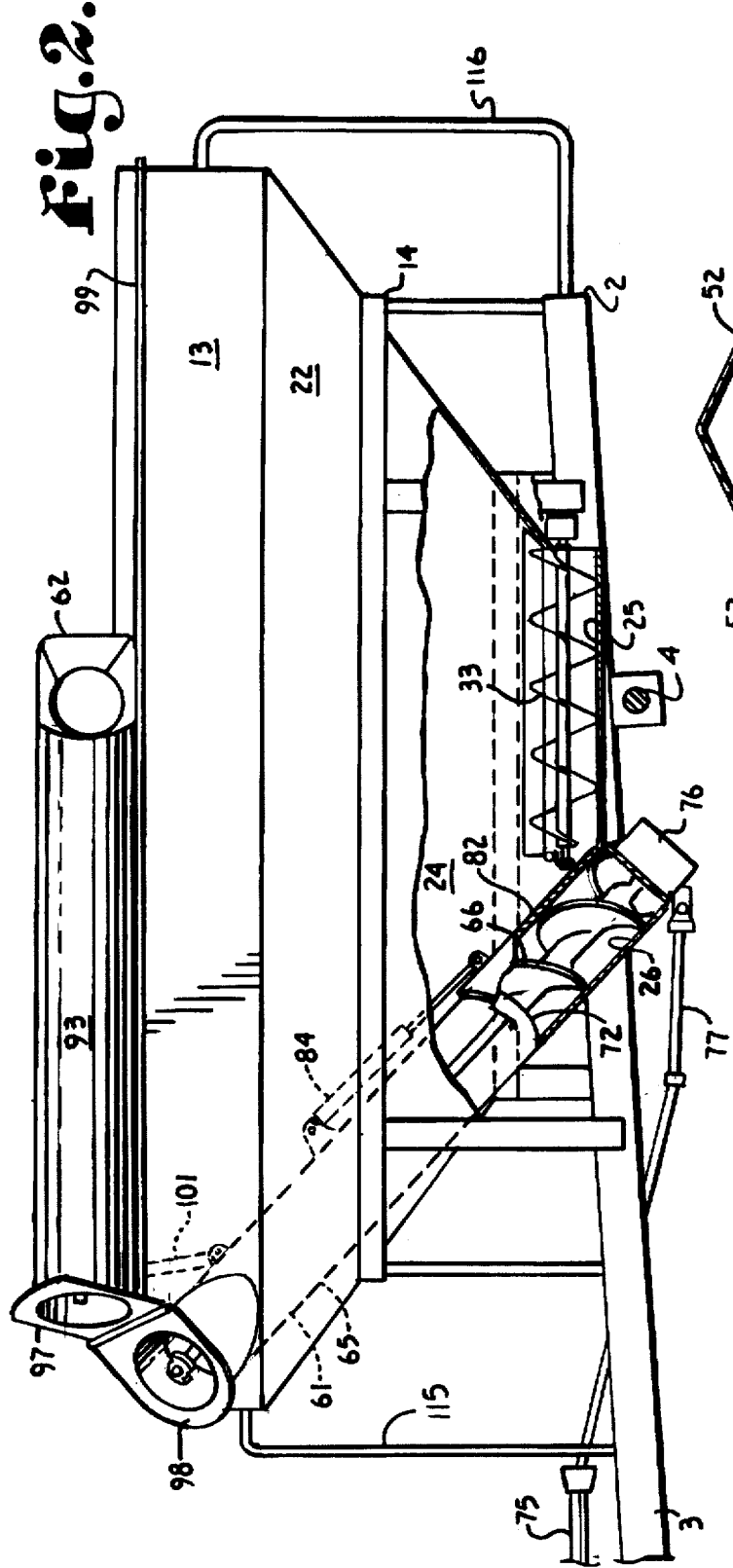

5,733,094

GRAIN CART EQUIPPED WITH INDEPENDENTLY DRIVEN DRAG AUGER

BACKGROUND OF THE INVENTION

1. Field of the Invention

The present invention relates to grain carts of the type used to transport and discharge harvested grain and other particulate agricultural products and in particular grain carts incorporating a horizontal drag auger in combination with a vertical discharge auger for unloading the cart.

2. Description of the Related Art

Grain carts are typically used in combination with combines during the harvesting procedure to facilitate transfer of grain from the combines to trucks waiting outside of the fields being harvested. The combines can only store a limited amount of grain, typically about 200 bushels. Grain carts, depending on the type, can typically hold between 500 and 1200 bushels of grain. In use, grain carts can be pulled by a tractor, up along the side of an operating combine, such that the combine operator may discharge grain stored in the combine into the grain cart without having to stop harvesting. A single grain cart can alternatively service several combines operating at the same time eliminating combine downtime and maximizing combine use.

Grain carts incorporate a relatively large bin for storing grain and a discharge auger assembly for discharging grain from the bin. The discharge auger generally extends from the bottom of the bin upward and beyond an upper edge of the bin and away from the cart for discharging grain into a truck or other storage vessel.

Grain carts such as the carts shown in U.S. Pat. No. 4,923,358 to Van Mill and U.S. Pat. No. 5,100,281 to Grieshop rely solely on gravity to feed grain in the bin to the discharge auger. The side walls and end walls of the bins of such carts are sloped downwardly and inwardly and converge at a sump, into or below which the lower or intake end of the discharge auger is positioned. The requisite degree of sloping of the bin side walls and end walls to ensure proper feed of grain to the discharge auger results in grain carts with a relatively high profile and high center of gravity. The high profile often presents difficulties in making sure that the discharge auger from combines or other carts will extend over the grain cart bin walls. The high center of gravity of such carts presents disadvantages including poor handling and the potential for tipping.

Relatively low profile grain carts have been developed which incorporate a horizontally extending drag auger for feeding grain to the discharge auger such as the grain cart shown in U.S. Pat. No. 3,994,512 to Parker et al. In such carts, the sidewalls converge to form a trough extending centrally and longitudinally along the bottom of the bin. Grain or other particulate materials feed into the trough by gravity. The drag auger is secured in the trough and advances or drags the material forward to a sump extending adjacent to and below the drag auger. The lower end of the discharge auger extends into the sump.

The drag auger in such carts is relatively long and generally extends the entire length of the cart. The drag auger and the discharge auger operate simultaneously and are driven by the same power source, typically the tractor power-take off. A gear box and various chains and sprockets connected to the power-take off, all requiring considerable maintenance, are used to separately but contemporaneously drive the drag and discharge augers from the power-take off.

Such carts require use of retractable covers, doors or gates to cover the drag auger when the bin is full so that the drag auger may be started without damaging the tractor or the cart. After the drag auger is started, the doors, gates or covers are gradually opened, usually hydraulically, to control the flow of grain to the auger and prevent excessive strain thereon from the weight of the grain in the bin. Such hydraulically operated covers, doors or gates add to the initial cost of the carts and require additional maintenance.

Accordingly, it is clear that a need exists for an improved grain cart for the reliable transport and discharge of grain and other agricultural products. Such an improved cart should have a relatively low profile while providing simple yet efficient means for unloading the cart.

SUMMARY OF THE INVENTION

The present invention generally comprises a grain cart which initially utilizes gravity feed alone and then gravity feed and a horizontal drag auger to feed grain in the grain cart storage bin to an unloading auger for discharging grain from the grain cart storage bin.

The storage bin is supported on a wheeled frame adapted to be pulled by a tractor. The sidewalls of the bin converge inwardly and downwardly to a trough and a sump. The trough extends across a portion of the bottom of the storage bin and opens into the sump at a discharge end thereof. The sump is positioned adjacent to the discharge end of the trough and extends at least partially below the trough.

A drag auger is rotatably secured in the trough and has a discharge end aligned with the trough discharge end. An unloading auger assembly comprising an unloading chute and an unloading auger rotatably mounted therein is secured to the storage bin. A lower end of the unloading chute opens into the sump and a lower end of the unloading auger extends into the sump such that at least a portion of the lower end of the unloading auger is positioned below and adjacent to the drag auger discharge end. The unloading auger assembly extends upwardly and away from the storage bin.

A first drive means, such as a tractor power-take off, is used to rotatably drive the unloading auger. A second drive means, such as a hydraulic motor, is used to independently and selectively drive the drag auger. When a full grain cart is to be unloaded, the unloading auger is engaged and a cover or plate extending over the lower portion of the unloading auger is retracted to allow the grain to feed by gravity into the sump and the unloading auger. The grain is then discharged from the bin by the unloading auger.

As the amount of grain being fed into the sump by gravity begins to taper off, the drag auger is engaged to advance remaining grain into the sump and the unloading auger. A cover is secured to the bin and extends over the drag auger. The cover is spaced above the drag auger and the bottom of the bin such that openings are formed between the cover and the bin and through which grain can flow into said trough.

OBJECTS AND ADVANTAGES OF THE PRESENT INVENTION

The objects and advantages of the present invention include: providing an improved grain cart; providing such a grain cart having a relatively low profile; providing such a grain cart which initially utilizes gravity feed alone and then gravity feed and a horizontal drag auger to feed grain in a storage bin of the grain cart to an unloading auger for discharging grain therefrom; providing such a grain cart having downwardly and inwardly sloping sidewalls which converge along a trough and a sump extending along a bottom of the bin; to provide such a grain cart wherein the trough opens into the sump which is positioned adjacent the trough; providing such a grain cart having the drag auger rotatably mounted in said trough for feeding grain to the sump; providing such a grain cart wherein a lower portion of the unloading auger extends into the sump; providing such a grain cart wherein said unloading auger extends upwardly and forwardly along the front left corner of said bin and therebeyond; providing such a grain cart wherein an upper portion of the unloading auger is retractable between an extended discharge position and a retracted storage position and providing such a grain cart which is economical to manufacture, efficient and convenient to operate, easy to maintain, capable of a long operating life and which is particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2 is a fragmentary, left side plan view of the grain cart of FIG. 1 with the upper portion of the unloading chute pivoted to a lowered, storage position and with portions broken away to show detail thereof including a drag auger and an unloading auger.

FIG. 5 is a cross-sectional view taken along line 5—5 of FIG. 4.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functions details disclosed herein are not to be interpreted as limiting, but merely as a basis for the claims and as a representative basis for teaching one skilled in the art to variously employ the present invention in virtually any appropriately detailed structure.

Figure 1:
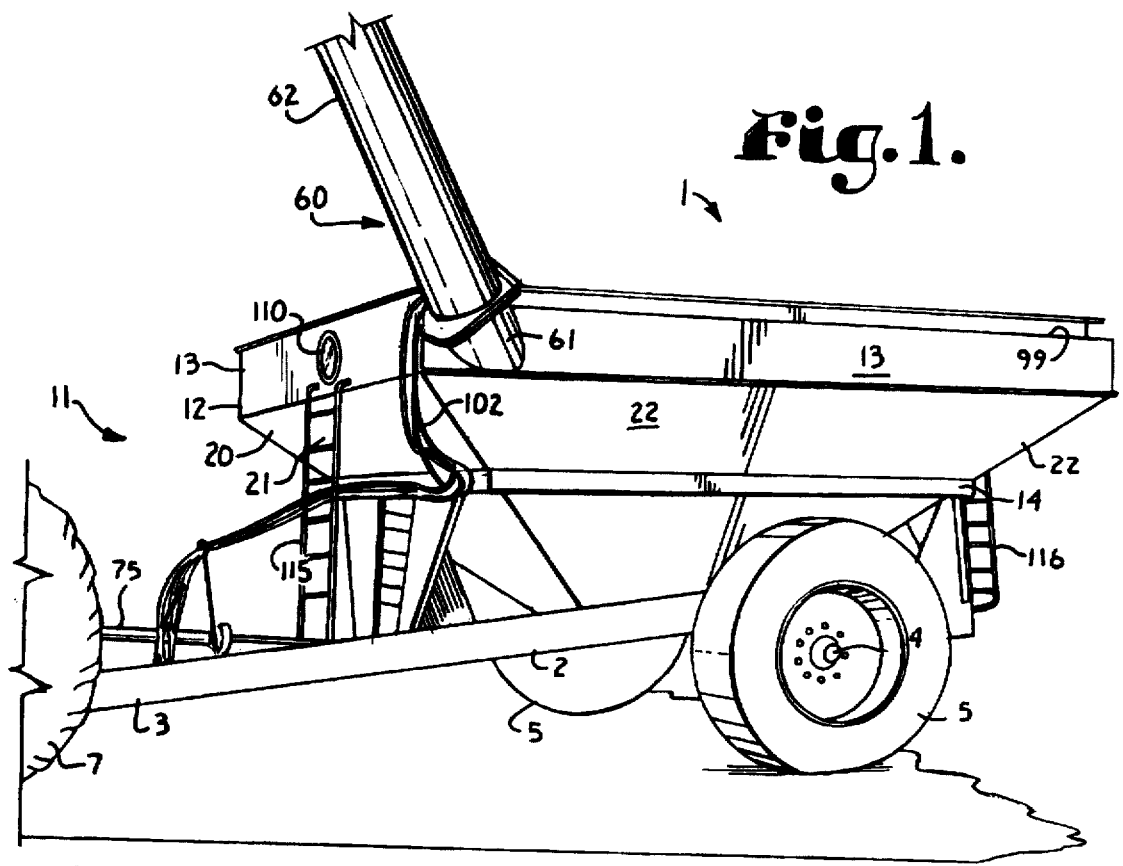
FIG. 1 is a fragmentary perspective view of a grain cart in accordance with the present invention towed by a tractor and with an upper portion of an unloading chute pivoted to a raised discharge position.
Figure 3:
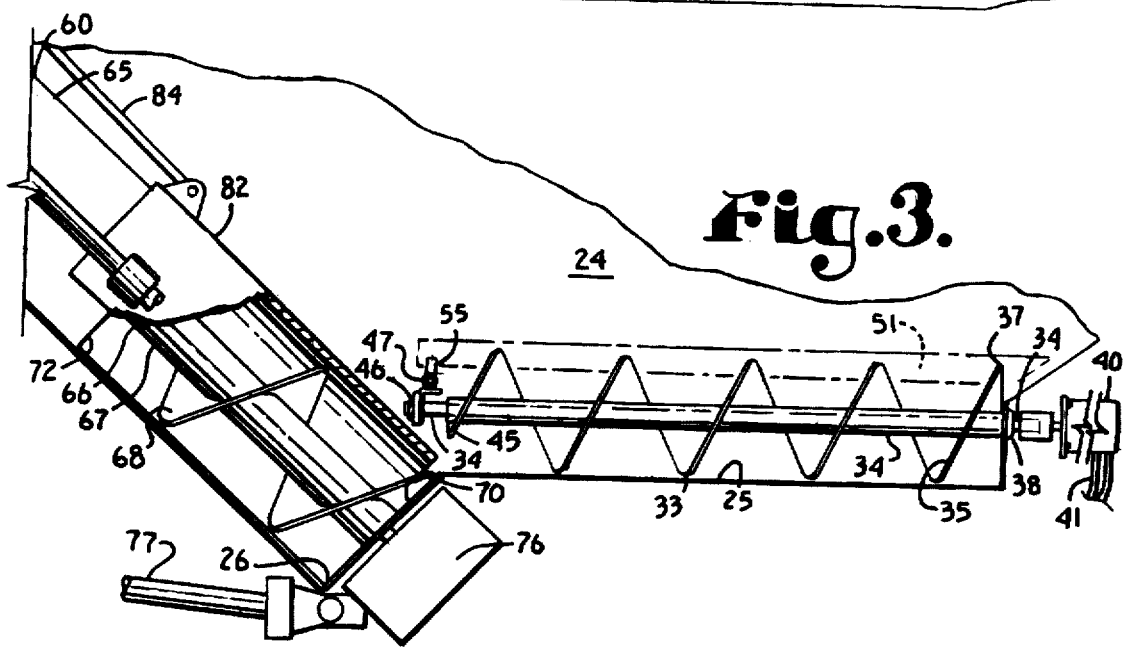
FIG. 3 is an enlarged, fragmentary schematic view of the drag auger and unloading auger as shown in FIG. 2.
Figure 4:
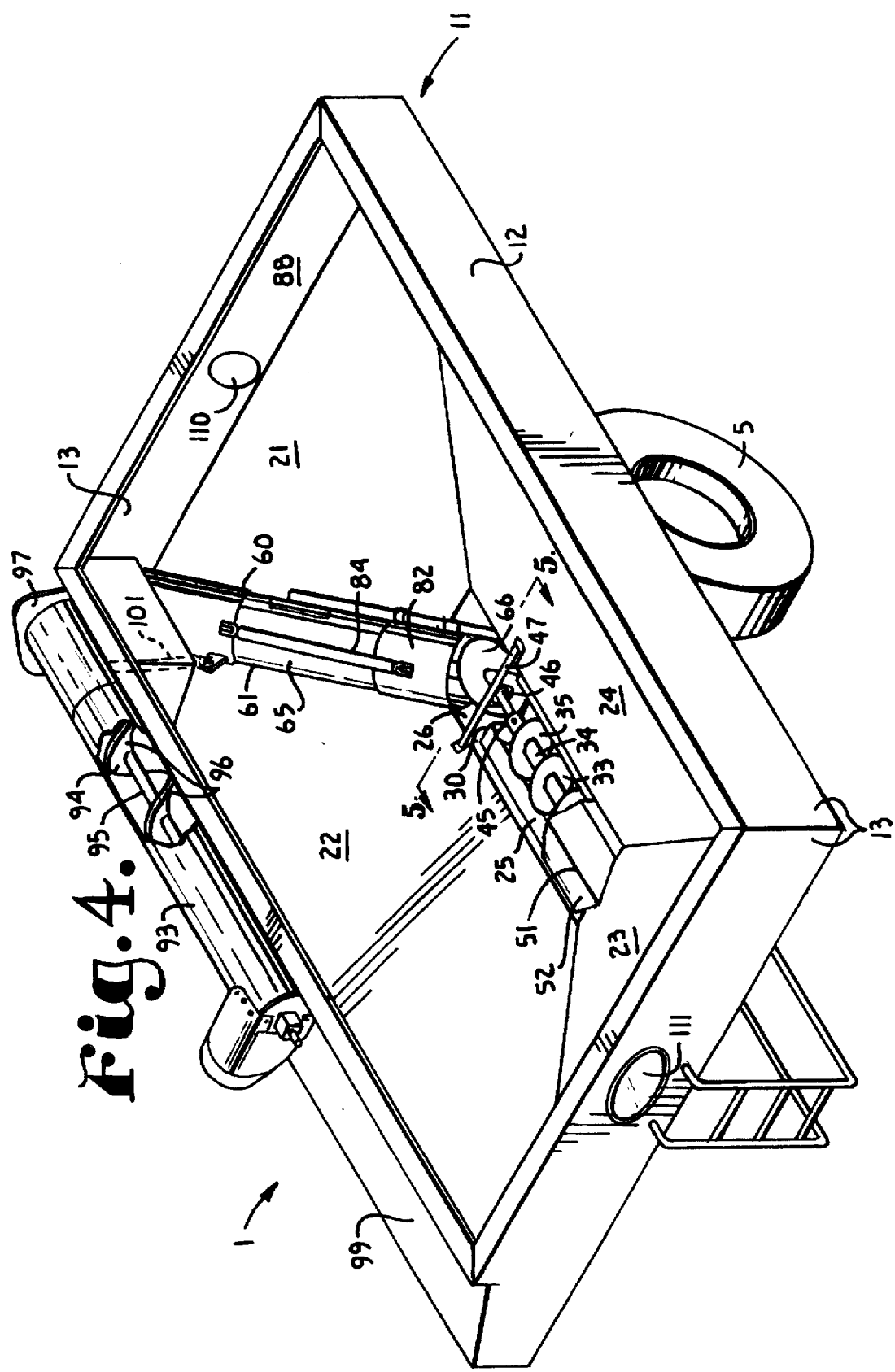
FIG. 4 is a top perspective view of the grain cart of the present invention generally rotated 180 degrees relative to FIG. 1 showing a cover for a lower end of the unloading auger partially retracted.

Referring to the drawings in more detail, reference numeral 1 in FIG. 1 generally designates a grain cart in accordance with the present invention. The cart 1 comprises a lower frame 2 including a tongue 3. The frame 2 is supported by an axle 4 with a pair of wheels 5 attached thereto. The cart 1 is adapted to be secured to a tow vehicle such as a tractor 7 via tongue 3.

A grain storage bin, generally indicated as 11, comprises an upper portion 12 with substantially vertical sidewalls 13. The grain bin 11 is supported by a rectangular framework 14 which is attached to the lower frame 2. Extending downward from the upper portion 12, the bin includes a lower portion 20 with four trapezoidal sidewalls; front sidewall 21, left sidewall 22, rear sidewall 23 and right sidewall 24, each of which tapers inward and downward to converge at a trough 25 and a sump 26.

The trough 25 and sump 26 extend longitudinally along the bottom of the bin 11. The trough 25 extends from a lower edge of the rear sidewall 23 toward a lower edge of the front sidewall 21 and ends at a discharge end 30. The sump 26 is positioned adjacent the trough discharge end 30 and extends from the trough discharge end 30 to a lower edge of the front sidewall 21. The trough discharge end 30 opens into the sump 26.

A drag auger 33, incorporating a shaft 34 and helical flights 35 is rotatably secured in the trough 25. The portion of the shaft 36 extending from a first end 37 of the drag auger 33 extends through and is rotatably supported by a bearing 38 in trough end wall 39. A hydraulic motor 40 is secured to the drag auger shaft 36 for imparting rotational motion thereon such that the hydraulic motor 40 generally functions as drive means for rotatably driving drag auger 33. Hydraulic lines 41 extend from the hydraulic motor 40 to a hydraulic pump (not shown) on the tractor 7 or comparable tow vehicle.

The drag auger 33 generally extends horizontally in the trough 25 from its first end 37 to a discharge end 45 of the drag auger 33 which is generally aligned with the trough discharge end 30. The portion of the shaft 34 extending from the drag auger discharge end 45 is rotatably secured by a bearing 46 supported on a strut 47 extending between left and right sidewalls 22 and 24.

A stationary cover 51 is supported above and generally covers the drag auger 33. The cover 51 includes angled top walls 52 and vertically extending side walls 54. The cover 51 is spaced above the drag auger 33 by legs or brackets 55 secured to the bin sidewalls 22 and 24 and the strut 47. Openings are formed and generally extend between the cover 51 and the bin sidewalls 22 and 24 through which granular material can flow into the trough 25 and drag auger 33.

The cart 1 also includes an unloading auger assembly 60 which comprises a lower section 61 and an upper section 62. The lower section 61 generally extends from the sump 26, upward along the confluence between the front sidewall 21 and the left sidewall 22, and through the upper bin portion 12. The lower section 61 of the auger assembly 60 comprises a lower unloading chute 65 which is generally cylindrical and a lower auger 66 rotatably mounted therein. The lower auger 66 includes a shaft 67 and helical flights 68.

A lower end 80 of the lower unloading chute 65 generally extends up to but not into the sump 26. A lower section 69 of the lower auger 66 extends beyond the lower end 80 of the chute 65 and into the sump 26. The shaft 67 of the lower auger 66 extends through and is rotatably mounted in a side wall 70 of the sump 26. The lower auger shaft 67 is connected to the tractor power-take off 75 via conventional gear box 76 and drive shaft assembly 77. The power-take off 75, gear box 76 and drive shaft assembly 77 function as drive means for rotatably driving the lower auger 66. It is foreseen that the drive means for the auger assembly 60 may comprise a wide range of drive mechanisms including a hydraulic motor connected to a hydraulic pump on the tractor 7.

A retractable cover 82 comprising a semi-cylindrical plate is slidingly mounted to the lower unloading chute 65. The cover 82 is selectively movable via a double-acting hydraulic actuator 84 between a closed or extended position at which it extends over the lower section 69 of the lower auger 66 and an open or retracted position in which the cover 82 is retracted away from the lower section 69 of the lower auger 66. In the closed position, the cover 82 generally closes off the sump 26 and access to the lower auger 66 from the bin 11. In the open position, the sump 26 is opened up to the bin 11 and access is provided to the lower auger 66 from the bin 11. The cover 82 can be stopped at any desired interim position to thereby control the amount of grain entering the sump 31.

The upper section 62 of the unloading auger assembly 60 comprises an upper unloading chute 93 which is generally cylindrical and an upper auger 94 rotatably mounted therein. The upper auger 94 includes a shaft 95 and helical flights 96. A lower end 97 of the upper unloading chute 93 is connected to an upper end 98 of the lower unloading chute 65. The upper section 62 of the unloading auger assembly 60 is pivotable between an extended, unloading position and a retracted storage position.

In the unloading position, the upper section 62 is generally positioned in end to end alignment with the lower section 61 of the auger assembly 60 such that the upper section 62 generally extends upward, forward relative to and away from the cart on about a forty-five degree angle relative to the front of the cart 11. In the retracted storage position, the upper section 62 generally extends adjacent to and along the left side of the bin 11. A shoulder or ledge 99 is formed in the upper portion 12 of the bin 11 and extends along the left side thereof to generally support the upper section 62 when it is retracted to the storage position.

The upper section 62 is selectively advanceable between the unloading and storage positions by a double-acting hydraulic actuator 101 connected at one end to the upper section 62 and at an opposite end to the lower section 61. Hydraulic actuators 84 and 101 are connected to a hydraulic pump (not shown) on the tractor 7 by hydraulic fluid supply lines 102. The actuator 101 and hydraulic supply lines 102 extend through an opening (not shown) in the upper portion 12 of the bin 11.

When the upper section 62 is advanced to the extended unloading position, the lower shaft 67 and the upper auger shaft 95 are coupled together by conventional coupling means such as male and female connectors (not shown) such that the upper auger 94 is driven by the lower auger 66 which is in turn driven by the tractor power-take off 75. It is foreseen that a wide range of configurations of unloading auger assemblies could be utilized with the grain cart 1 of the present invention and that the upper auger 94 could be driven by separate drive means such as a hydraulic motor. Further it is foreseen that the unloading auger assembly 60 could be oriented to extend in different directions including to the side of the bin 11 perpendicular to the direction of travel of the cart 1 or to the rear.

Windows 110 and 111 are positioned in front and rear panels respectively of the upper portion 12 of the bin 11. A front ladder 115 is secured to the framework 14 at a front end thereof and a rear ladder 116 is secured to the lower frame 2 and bin 11 at a rear end thereof. A tractor operator seated on the tractor can look into the bin 11 through the front window 110. Closer inspection of the bin 11 can be accomplished by climbing the ladders 115 and 116 to look through the windows 110 and 111 or over the sides of the bin 11.

The grain cart 1 of the present invention is particularly well adapted for use in transferring grain from combines harvesting grain in fields to trucks waiting outside the field. Before taking on a load of grain, the retractable cover 82 is extended to the closed position to keep grain out of the sump 26 and the lower auger 66. The upper section 62 of the unloading auger assembly. 60 is retracted to a storage position. The cart 1 is pulled up along side a combine as it is moving in a field and the combine discharges its stored grain into the bin 11. The bin 11 is sized so that it can store grain from several combines before having to unload.

To unload the grain from the cart 1, the cart 1 pulls up along side a truck or other receptacle and the upper section 62 of the unloading auger assembly 60 is hydraulically advanced by the tractor operator to the extended position such that an end of the assembly 60 extends over the truck or receptacle. The tractor operator engages the lower and upper augers 66 and 94 and then gradually retracts the retractable cover 82 allowing grain stored in the bin 11 to feed into the sump 26 and the lower section 69 of the lower auger 66 by gravity. The lower and upper augers 66 and 94 feed the grain through the lower and upper unloading chutes 60 and 93 and discharge the grain out an end thereof and into the truck or receptacle. The cover 82 is retracted gradually to prevent large amounts of grain entering the sump 26 too quickly and causing the lower auger 66 to bind.

As the amount of grain flowing by gravity into the sump 26 begins to taper off, the operator engages the drag auger 33. The drag auger 33 advances grain along the trough 25 and past the trough discharge end 30 such that the grain falls or is otherwise directed into the sump 26 where it is then fed out of the bin 11 via the unloading auger assembly 60. As the drag auger 33 advances grain along the trough 25, additional grain flows by gravity into the trough 25 and is then advanced to the sump 25.

The tractor operator can determine that the amount of grain flowing by gravity into the sump 26 is tapering off by watching the rate of discharge of grain from the unloading auger assembly 60. Extending the unloading auger assembly 60 along the front left corner of the bin 11 and therebeyond positions the end of the assembly 60 relative to the tractor operator for easier viewing which facilitates monitoring of grain flow therefrom.

The bin 11 is generally sized such that approximately half of the contents of the bin 11 will empty by gravity flow alone into the sump 26 before the flow tapers off and the drag auger 33 must be activated to assist in emptying the remaining contents of the bin 11. The stationary cover 51 prevents the drag auger 33 from having to begin rotating against the weight of the entire height of remaining grain in the bin 11 to help keep the drag auger 33 from binding. However, it is foreseen that the grain cart 1 could incorporate some form of selectively removable cover for the drag auger 33 to further reduce strains on the drag auger 33 when it is initially engaged.

It is to be understood that while certain forms of the present invention have been illustrated and described herein, it is not to be limited to the specific forms or arrangement of parts described and shown.

What is claimed and desired to be secured by Letters Patent is as follows:

1. A cart for storing and transporting granular material comprising:
 a. a frame supported by a plurality of wheels;
 b. a storage bin connected to said frame, said storage bin including a first and second pair of opposing sidewalls; said first pair of opposing sidewalls converging downwardly and inwardly to a trough and a sump extending across a bottom of said storage bin; said trough extending across a first portion of said bottom of said storage bin and opening into said sump at a discharge end thereof; said sump extending across a second portion of said bottom of said storage bin and positioned adjacent said discharge end of said trough; a portion of said sump extending lower than said trough; said sump opening directly to said bin; one of said sidewalls of said second pair of opposing sidewalls sloping downwardly and inwardly to an end of said sump opposite said discharge end of said trough;

c. a drag auger rotatably secured in said trough and having a discharge end aligned with said trough discharge end; and d. an unloading chute secured to said storage bin and having an unloading auger rotatably secured therein; a lower end of said unloading auger extending into said sump such that at least a portion of said lower end of said unloading auger is positioned lower than and adjacent to said drag auger discharge end; said unloading chute extending upwardly and away from said storage bin.

2. The cart of claim 1 further comprising:

a. a cover secured to said bin and extending at least partially across said drag auger; said cover spaced above said drag auger such that openings are formed between said cover and said bin through which granular material can flow into said trough.

3. The cart of claim 1 wherein said unloading chute extends from said sump along and beyond a left front corner of said storage bin.

4. The cart of claim 1 wherein:

a. said unloading chute comprises an upper section and a lower section;

b. said unloading auger comprises an upper section rotatably secured in said unloading chute upper section and a lower section rotatably secured in said unloading chute lower section;

c. means for pivotally securing said unloading chute upper section to said unloading chute lower section such that said unloading chute upper section is pivotable between an extended position and a retracted position, in said extended position said unloading chute upper section extending upward and away from said storage bin substantially in alignment with said unloading chute lower section and in said retracted position said unloading chute upper section extending along a side of said storage bin.

5. The grain cart of claim 4 wherein a ledge is formed along a left side of said grain bin and said upper section of said unloading chute is supported on said ledge when said unloading chute upper section is pivoted to said storage position.

6. The grain cart as disclosed in claim 1 further comprising:

a. a window positioned in a front wall of said bin.

7. The grain cart as disclosed in claim 1 further comprising:

a. a retractable cover which is selectively movable between a first position in which it covers said lower portion of said unloading auger extending into said sump to prevent material from feeding into said lower portion of said unloading auger, and a second position in which said plate is moved away from said lower portion of said auger extending into said sump to permit material to feed into said lower portion of said unloading auger.

8. The cart of claim 1 including:

a. first drive means for rotatably driving said unloading auger; and b. second drive means for rotatably driving said drag auger independently from said unloading auger.

9. The cart of claim 1 wherein said sidewalls comprise a front sidewall, a left sidewall, a rear sidewall and a right sidewall and said sump extends proximate a convergence of said front sidewall with said left and right sidewalls.

10. A cart for storing and transporting granular material comprising:

a. a frame supported by a plurality of wheels;

b. a storage bin connected to said frame, said storage bin including front, left, rear, and right sidewalls which converge inwardly and downwardly to a trough and a sump; said trough extending across a first portion of a bottom of said storage bin and opening into said sump at a discharge end thereof; said sump extending across a second portion of said bottom of said storage bin adjacent said discharge end of said trough; a portion of said sump extending lower than said trough; said sump opening directly to said bin; said front sidewall sloping downwardly and inwardly to an end of said sump opposite said discharge end of said trough;

c. a drag auger rotatably secured in said trough and having a discharge end aligned with said trough discharge end;

d. an unloading auger assembly secured to said storage bin and having an upper unloading chute with an upper auger rotatably secured therein and a lower unloading chute with a lower auger rotatably secured therein; a lower end of said lower unloading chute opening into said sump and a lower end of said lower auger extending into said sump such that at least a portion of said lower end of said lower auger is positioned lower than and adjacent to said drag auger discharge end;

e. said lower unloading chute extending upwardly along the confluence between said left sidewall and said front sidewall of said storage bin, and through an upper portion of said bin; and f. means for pivotally securing said upper unloading chute to said lower unloading chute such that said upper unloading chute is pivotable between an extended position and a retracted position; in said extended position said upper unloading chute extending upward and away from said storage bin substantially in alignment with said lower unloading chute and in said retracted position said upper unloading chute extending along a side of said storage bin.

11. The cart of claim 10 further comprising:

a. a cover secured to said bin and extending at least partially across said drag auger; said cover spaced above said drag auger such that openings are formed between said cover and said bin through which granular material can flow into said trough.

12. The grain cart of claim 10 wherein a ledge is formed along a left side of said grain bin and said upper unloading chute is supported on said ledge when said upper unloading chute is pivoted to said storage position.

13. The grain cart as disclosed in claim 10 further comprising:

a. a window positioned in a front wall of said bin.

14. The grain cart as disclosed in claim 10 further comprising:

a. a retractable cover which is selectively movable between a first position in which it covers said lower portion of said unloading auger extending into said sump to prevent material from feeding into said lower portion of said unloading auger, and a second position in which said plate is moved away from said lower portion of said auger extending into said sump to permit material to feed into said lower portion of said unloading auger.

15. The cart of claim 10 including:
  a. first drive means for rotatably driving said unloading auger; and
  b. second drive means for rotatably driving said drag auger independently from said unloading auger.

16. A cart for storing and transporting granular material comprising:
  a. a frame supported by a plurality of wheels;
  b. a storage bin connected to said frame, said storage bin including front, left, rear, and right sidewalls which converge inwardly and downwardly to a trough and a sump extending across a central portion of a bottom of said storage bin; said trough opening into said sump at a discharge end thereof; said sump extending from said trough discharge end to a lower portion of said front sidewall; a portion of said sump extending lower than said trough; said sump opening directly to said bin;
  c. a drag auger rotatably secured in said trough and having a discharge end aligned with said trough discharge end; and
  d. an unloading chute secured to said storage bin and having an unloading auger rotatably secured therein; a lower end of said unloading auger extending into said sump such that at least a portion of said lower end of said unloading auger is positioned lower than and adjacent to said drag auger discharge end; said unloading chute extending upwardly and away from said storage bin.

17. The cart of claim 16 wherein said unloading chute extends from said sump along and beyond a left front corner of said storage bin.

18. The cart of claim 16 wherein:
  a. said unloading chute comprises an upper section and a lower section;
  b. said unloading auger comprises an upper section rotatably secured in said unloading chute upper section and a lower section rotatably secured in said unloading chute lower section;
  c. means for pivotally securing said unloading chute upper section to said unloading chute lower section such that said unloading chute upper section is pivotable between an extended position and a retracted position, in said extended position said unloading chute upper section extending upward and away from said storage bin substantially in alignment with said unloading chute lower section and in said retracted position said unloading chute upper section extending along a side of said storage bin.

19. The grain cart of claim 18 wherein a ledge is formed along a left side of said grain bin and said upper section of said unloading chute is supported on said ledge when said unloading chute upper section is pivoted to said storage position.

20. The cart of claim 16 including:
  a. first drive means for rotatably driving said unloading auger; and
  b. second drive means for rotatably driving said drag auger independently from said unloading auger.

* * * * *